No. 788,135. PATENTED APR. 25, 1905.
G. L. HARVEY.
FRICTION DEVICE.
APPLICATION FILED JULY 5, 1904.
2 SHEETS—SHEET 1.
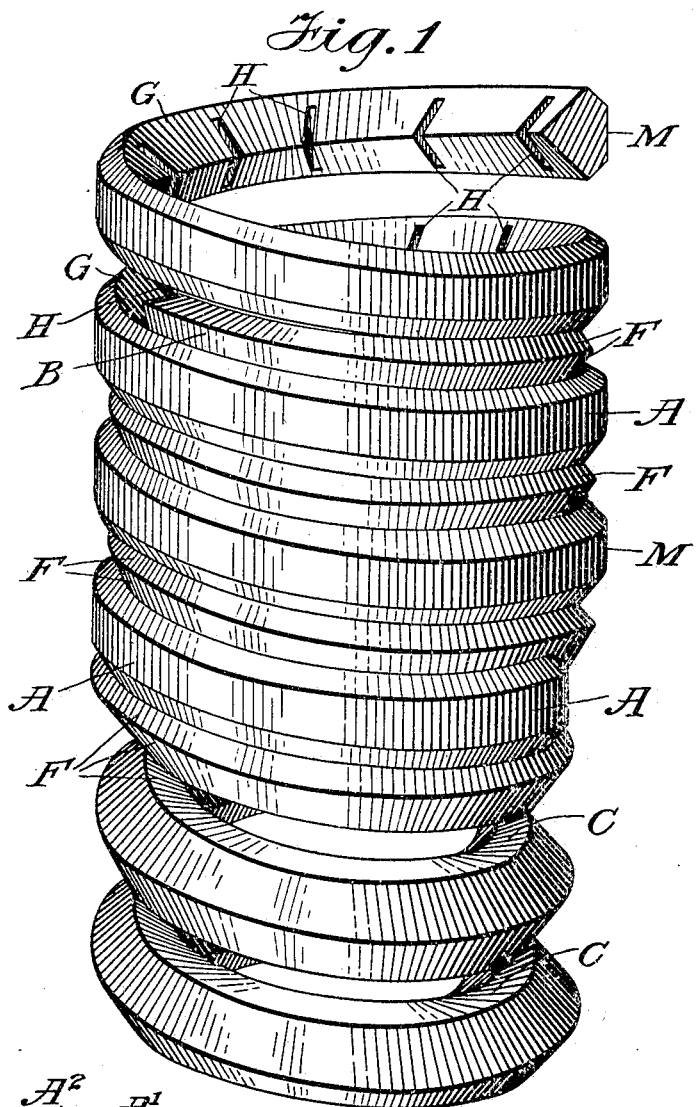
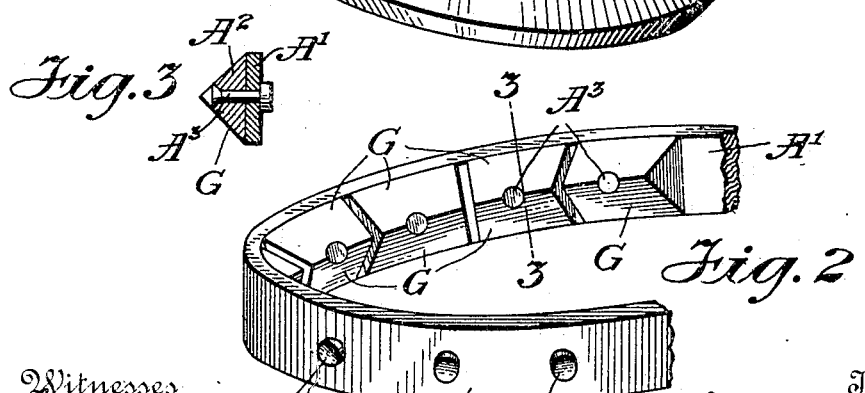
Witnesses
Inventor
George L. Harvey
By his Attorneys
Betts Betts Sheffield Betts

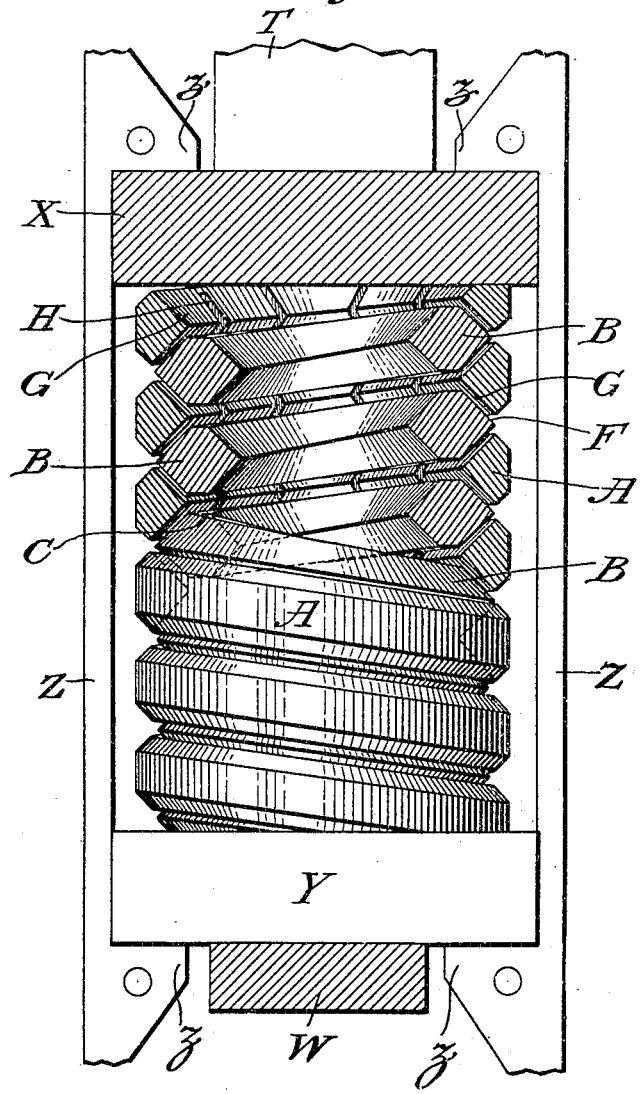

No. 788,135.                                                                                   Patented April 25, 1905.

UNITED STATES PATENT OFFICE.

GEORGE LYON HARVEY, OF CHICAGO, ILLINOIS.

FRICTION DEVICE.

SPECIFICATION forming part of Letters Patent No. 788,135, dated April 25, 1905.

Application filed July 5, 1904. Serial No. 215,213.

*To all whom it may concern:*

Be it known that I, GEORGE LYON HARVEY, a citizen of the United States, residing at Chicago, in the county of Cook and State of Illinois, (having a post-office address at 175 Dearborn street, Chicago, aforesaid,) have invented certain new and useful Improvements in Friction Devices, of which the following is a full and true description, reference being had to the accompanying drawings, showing embodiments of my invention.

The object of this invention is the production of an exceedingly efficient and economical form of friction device especially useful as a compression-spring for draw-gear for railway-cars; and the improvements consist in the novel features and combinations hereinafter pointed out.

The invention is especially useful with that form of friction device containing an endwise-compressible member having frictional surfaces and a second member with which the first-named member has frictional engagement when the device is subjected to buffing or pulling strains.

In the accompanying drawings, Figure 1 is a view showing the members of my new friction device while being wound together. Fig. 2 is a view of a portion of one member, showing a modified form of the invention. Fig. 3 is a sectional view on the line 3 3 of Fig. 2; and Fig. 4 is a plan view, partly in section, showing my present improvements in use with draft-rigging of a railway-car.

As shown in the drawings, my new friction device is provided with an endwise-compressible member A, consisting of a succession of coils or loops. In Figs. 1 and 4 I have shown the said member as made up of a connected succession of coils or loops of pentagonal bar metal, the whole made by winding upon a mandrel or otherwise and having the surfaces M substantially parallel with the axis of the member A and with upper and lower frictional surfaces G disposed at angles of substantially forty-five degrees with respect to said axis.

A distinctive point of novelty of my present invention consists in providing a form of member A, which while very supple or adapted to readily yield to radial strains or distortion yet presents a large frictional area for frictional engagement with a coöperating member.

I have discovered that if the frictional surfaces G of the members A are not as long as the coil or coils of which they form a part the frictional surface of the said coil or coils will not be appreciably reduced, while the entire member will more readily yield to radial or distortional strains. The result spoken of may be attained by removing, by sawing or otherwise, portions of the bar itself, thus dividing the frictional surfaces into bodies of, say, one inch in length and thinning the coil or coils, or the result may be attained by applying to a heavy metallic strip of substantially equal thickness from end to end a succession of blocks slightly separated from one another, as shown in Fig. 2. If desired, the coil or coils may be formed in any other suitable manner to provide the thinner and thicker portions or to provide the coil or coils with portions which are exceedingly flexible while retaining the exceedingly large frictional surfaces.

As shown in Figs. 1 and 4, the bar may be provided with cuts H at intervals of, say, one inch. Saids cuts, which may all be on the same edge of the coil, will not extend entirely through the bar, but leave a considerable portion of the sectional area thereof intact. Instead of being formed from the metal of the coil or loop friction-blocks or friction-bodies may be fitted thereto. In Figs. 2 and 3 I have shown a succession of slightly-curved triangular blocks $A^2$ fitted to the strip $A'$ constituting the coil or loop by means of rivets $A^3$ or otherwise.

The friction device is provided with a second member B, against which the member A operates and with which it has frictional engagement under buffing or pulling strains. The second member may be yielding or unyielding and may be either compressible or incompressible endwise. The member A may be fitted to the second member in any suitable way, and I have shown it as surrounding the member B. The last-named member preferably consists, however, of a connected succession of coils or loops, which have frictional surfaces F substantially parallel with the frictional surfaces G of the member A.

When wound or fitted together, the adjacent coils or loops of the members A and B may be initially engaged, as shown in Fig. 1, or may be normally separated, as shown in Fig. 4. In the latter construction there will be no engagement of the members under initial compression of the friction device. As the compression is continued, however, the adjacent frictional surfaces F and G of the two members will come into frictional engagement, with the result that the coils of the member A in addition to the longitudinal compression are radially distorted or expanded, whereby the yielding resistance to the load is increased.

When the member A has a succession of frictional bodies or blocks, as shown, it is obvious that the frictional area or area of frictional contact between the surfaces F and G will not be appreciably reduced, although the coil or coils of the member A will be quite flexible and will more readily yield to radial strain than where the frictional surfaces are continuous from end to end of the coil or coils.

Preferably the device is provided with means to prevent the buckling or bending of the springs under load and to limit the extent of compression of the device. For this purpose I may provide adjacent coils or loops of the member B with flattened contact-faces C C. Under compression of the friction device said faces are brought solidly together, and there is little or no tendency of the adjacent coils to slip or slide past one another.

In Fig. 4 I have shown my new friction device employed in connection with draft-rigging of a railway-car. T indicates the tail of the coupler draw-bar. W indicates the yoke. X and Y indicate the forward and rear follower-plates, and Z Z indicate the draft-plates, which may be fitted between the usual draft-sills and provided with stops $z\ z$ for the follower-plates.

While I have herein shown and described two embodiments of my present improvements, I do not desire to be understood as limiting my invention thereto. Obviously other forms will readily suggest themselves to persons skilled in the art and still be within my claims.

What I claim is—

1. In a friction device, a member provided with a succession of frictional blocks or frictional bodies, in combination with a coöperating coiled member having frictional surfaces for engaging the blocks or bodies aforesaid, substantially as described.

2. In a friction device, a member comprising a loop or coil provided with a succession of frictional blocks or frictional bodies, in combination with a coöperating coiled member having frictional surfaces for engaging the blocks or bodies aforesaid, substantially as described.

3. In a friction device, a member provided with a succession of frictional blocks or frictional bodies integral with the member, in combination with a coöperating coiled member having frictional surfaces for engaging the blocks or bodies aforesaid, substantially as described.

4. In a friction device, a member consisting of a loop or coil provided with a succession of frictional blocks or frictional bodies integral with the loop or coil, in combination with a coöperating member having frictional surfaces for engaging the blocks or bodies aforesaid, substantially as described.

5. In a friction device, a member comprising a continuous loop or coil cut at intervals to render the loop or coil more flexible and provided with a succession of frictional blocks or frictional bodies, in combination with a coöperating member having frictional surfaces for engaging the blocks or bodies aforesaid, substantially as described.

6. In a friction device, a member comprising a continuous loop or coil having frictional surfaces which are cut at intervals to render the coil or loop more flexible, in combination with a coöperating member having frictional surfaces for engaging the frictional surfaces of the first-named member, substantially as described.

7. In a friction device, inner and outer coiled members having coöperating frictional surfaces, the frictional surfaces of one member consisting of a succession of frictional blocks or bodies, substantially as described.

8. In a friction device, a member provided with a succession of attached frictional blocks, in combination with a coöperating coiled member having frictional surfaces for engaging the frictional blocks aforesaid, substantially as described.

9. In a friction device, outer and inner coiled members, one of said coils being notched, the frictional surfaces of both coils being in contact during the entire operation of the spring, substantially as described.

10. In a friction device, outer and inner coiled members having their frictional surfaces in contact during the entire operation of the device, one of said coiled members having an alternating large and small cross-section, substantially as described.

11. In a friction device, a spring with frictional surfaces, the body of the spring having alternating large and small cross-section, substantially as described.

12. In a friction device, a coiled member, said member having a body of alternating large and small cross-section, substantially as described.

In witness whereof I have hereunto signed my name this 28th day of June, 1904.

GEORGE LYON HARVEY.

In presence of—
  MARIE KIRLIN HINCHER,
  HAROLD CLINTON FERREE.